United States Patent Office 3,316,758
Patented May 2, 1967

3,316,758
APPARATUS FOR TESTING TIRES AND OTHER TOROIDAL OBJECTS
Hans Wild, Muttenz, Switzerland, assignor to Fabrik fur Firestone Produckte AG., Pratteln, Switzerland, a corporation of Switzerland
Filed June 24, 1964, Ser. No. 377,664
11 Claims. (Cl. 73—146)

The invention concerns an apparatus for testing vehicle tires or other toroidal deformable objects.

Vehicle tires may be tested while positioned on a vehicle, but tests done in this fashion often waste time and money because one usually has to use not only a vehicle but also the services of a driver. For this reason machines have been built for testing tires in which the tire under test rolls on the circumference of a drum. The drum used has a finite diameter, causing the tire to deform quite differently than it does in practice.

It has also been proposed to construct these testing machines using an endless belt. However, such belts must be made relatively soft, and the softness of the belt, compared to a road surface, again causes deformation and thus wear on the tire which is substantially different from that experienced in practice.

Although, with these proposed testing devices, the tire is pressed against the drum or belt with a predetermined force, it has been found that the resulting deformation of the tire is not the same as that occurring under practical conditions on the road. With such devices it is, of course, possible to obtain comparative values from which one can infer the quality and characteristics of the tire, thus revealing differences between different types of tires and between tires made in different batches. However, particularly in the development of high-performance tires, it has been found very difficult to evaluate the worth of new designs, because of the difficulty in drawing reliable deductions from the results of test-stand measurements and so obtain valid information on the behavior of the tire when in use on the road.

According to another aspect of the present invention, there is provided a device for testing a sample vehicle tire or other toroidal deformable object comprising a plurality of rotatable elongated rollers mounted side by side with their longitudinal axes substantially parallel, and means for urging a sample under test into contact with at least some of said rollers.

Preferably, means are provided for driving the rollers to rotate them about their longitudinal axes. The rollers may be aligned, with their longitudinal axes disposed in a common plane. However, some of the rollers may be displaceable from the common plane, to thereby provide an uneven surface against which a sample may be urged. Thus, means may be provided for oscillating at least one of the rollers to thereby displace it from the common plane and provide a continually varying surface against which a sample may be urged.

The rollers are preferably cylindrical and all of the same diameter, the distance between the centers of adjacent rollers being less than twice the diameter of the rollers. However at least some of the rollers may be other than cylindrical.

Preferably, means are provided for rotating the sample to be tested about its axis. Some of the rollers may be prevented from rotating. Means may be provided for causing the rollers to rotate with a peripheral speed different from that of a sample under test.

Means may be provided for heating or cooling at least some of the rollers. Thus the rollers may be hollow, to allow heating or cooling fluids to pass therethrough.

The invention is illustrated, merely by way of example, in the accompanying drawings, in which.

Figure 1:
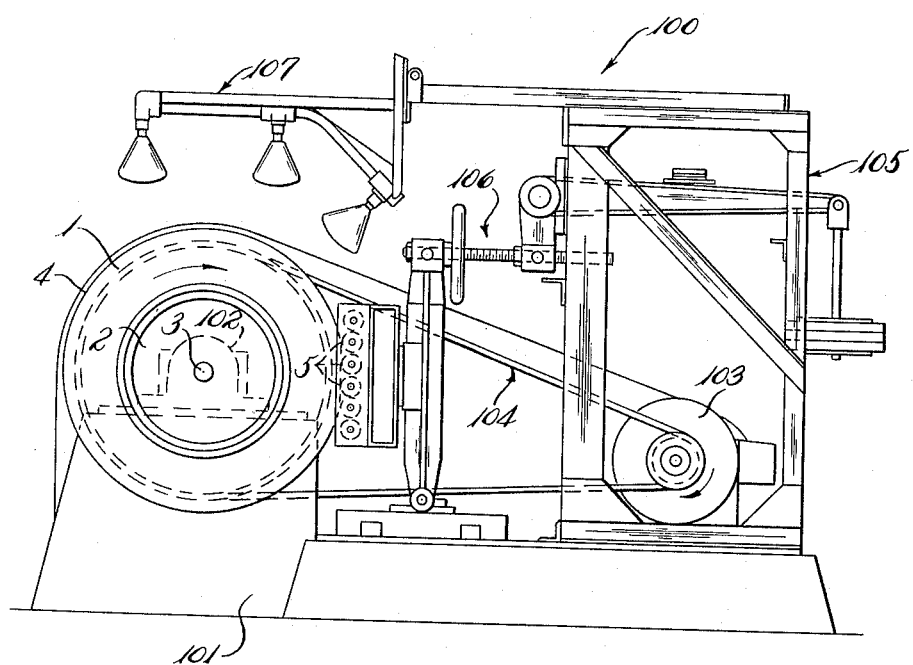
FIGURE 1 is a side elevation of a device according to the present invention being used to test a tire sample.

Exemplary apparatus for practicing the invention is shown in FIGURE 1, generally referred to at 100 and comprises a base 101 supporting bearings 102 for an axle 3; a motor 103 belt and pulley arrangement 104 for driving axle 3; a tire 1 and wheel 2 mounted on axle 3; a frame portion 105 supporting a mechanism 106 for urging rollers 5 against the tire 1; and means, such as heat lamps 107 to control the tire temperature during test.

Figure 2:
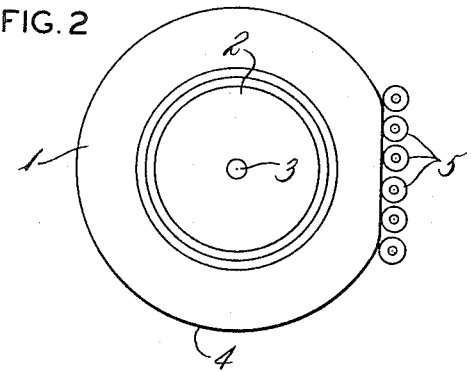
FIGURE 2 is a schematic elevation of a tire being tested according to the present invention.
Figure 3:
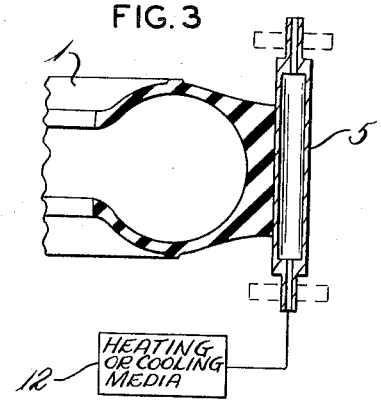
FIGURE 3 is an enlarged, fragmentary sectional view of the tire and device shown in FIGURE 2.

Referring to FIGURES 2 and 3 there is shown a sample tire 1 mounted on a wheel 2 which is rotatably mounted on an axle 3. The periphery 4 of tire 3 and the several cylindrical rollers 5 are urged into contact by means not shown.

The rollers 5 are elongated and are disposed with their longitudinal axes parallel. The diameter of each roller is about 2 inches and not more than one fifth of the diameter of the tire 1. Preferably it is less than one tenth and may even be only one fifteenth of the diameter of the tire. It will be appreciated that the smaller the diameter of the rollers, the more closely they can be situated to provide a running surface which approaches that provided by the normal running surface of a road.

In the embodiment of FIGURES 2 and 3 the longitudinal axes of the rollers 5 are all disposed in a common plane. The distance between adjacent rollers is as small as possible and is made less than twice the diameter of any roller to insure that the rollers are closely packed.

The axle 3 and rollers 5 are urged towards one another, to urge the periphery 4 into contact with the rollers. Either the axle 3 or the rollers may be moved while the other remains stationary. An indicating device is provided to measure the force with which the two are urged into contact.

The tire 1 is then rotated while in contact with rollers 5, being driven directly through its axle 3.

Figure 7:
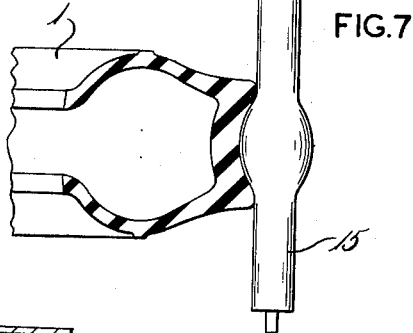

Alternatively, the tire may be driven by a driving member not shown, in contact with periphery 4, or one or more rollers 15 may be driven, as shown at 10 in FIGURE 7, to thereby rotate the tire 1 in contact therewith. The tire is thus tested under dynamic conditions somewhat similar to those experienced in practice.

Figure 4:
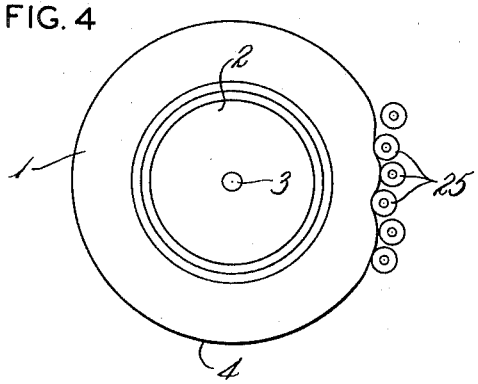
FIGURES 4 and 5 are schematic elevations showing modifications of the invention.
Figure 5:
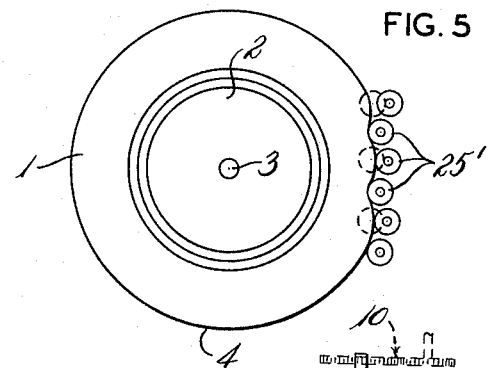

To provide further conditions which may be experienced in practice, some of the rollers can be horizontally displaceable. Thus, as shown in FIGURES 4 and 5, alternate rollers are displaced from their normal positions, in which their longitudinal axes are aligned with the longitudinal axes of the remaining rollers. In the embodiment of FIGURE 4, the alternate rollers 25 are fixed in their displaced positions to thereby provide a "permanent" uneven surface. In the embodiment of FIGURE 5, alternate rollers 25' are oscillated about their mean positions to thereby provide a continuously varying surface, thereby to simulate projecting stones or potholes in a road. To provide the oscillations, the rollers 25' may be activated hydraulically or with pneumatic rams or cylinders and pistons such as shown at 7 in FIGURE 8.

The rollers need not be cylindrical. Thus, they could be frusto-conical, as shown at 35 in FIGURE 6, or barrel-shaped, as shown at 15 in FIGURE 7. The rollers may be of mixed shapes. In each case more than two rollers are simultaneously in contact with the periphery 4 of the tire.

The rollers of the testing device are readily detachable from the device, such that further rollers of a different size or shape may replace those removed.

Figure 8:
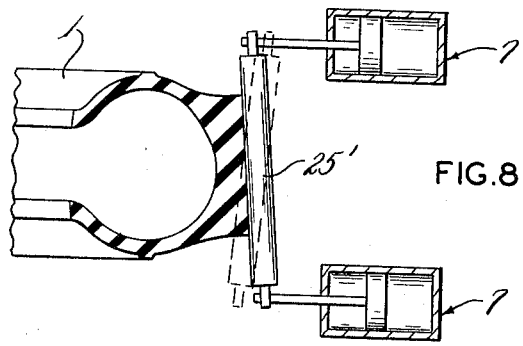

The longitudinal axes of some of the rollers may be displaced from their positions parallel to the remaining axes. Thus, as shown in FIGURE 8, the axes may be tilted with respect to the remaining axes by means of the means 7. Alternatively, the rollers may be maintained in their positions and the axle 3 may be tilted relative to them, to obtain the same condition. Thus, cornering of the vehicle tire may be simulated by these means.

With any size and shape of rollers, further variation may of course be obtained by selecting the surface of the rollers to suit the conditions required. Thus, the surfaces of the rollers may be smooth, rough, ribbed or of any other design.

The rollers may also be heated or cooled to provide yet a further variable, thus simulating hot or cold weather conditions. As shown in FIGURE 3, any of the rollers may be hollow, and means 12 may be provided to pump hot or cold fluid through the hollow rollers.

Figure 6:
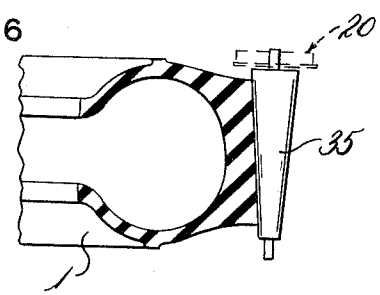
FIGURES 6, 7 and 8 are fragmentary sectional views showing tires being tested by further modifications of the invention.

Instead of allowing the rollers and tire to rotate at the same peripheral speeds, means are provided to drive the rollers, as at 10, FIGURE 7, or to brake the rollers as shown at 20, FIGURE 6, to provide them with a peripheral speed which is different from that of the tire. Thus acceleration and retardation may be simulated.

Although a preferred form of the invention has been described and shown herein, various modifications may be resorted to without departing from the spirit of the invention or the scope of the appended claims.

What we claim is:

1. Apparatus for testing a sample toroidal, deformable object, comprising means for substantially flattening a portion of said object, said means comprising at least three rotatable, closely spaced elongated rollers with sample-contacting portions of their peripheral surfaces lying in a plane and mounted with their longitudinal axes substantially parallel, and means for urging a sample into contact with said rollers.

2. Apparatus as in claim 1, wherein means are provided for driving the said rollers to rotate them about their longitudinal axes.

3. Apparatus as in claim 1, wherein at least some of the said sample-contacting portions of said rollers are displaceable from the said common plane to provide an uneven surface against which a sample may be urged.

4. Apparatus for testing a sample toroidal, deformable object, comprising a plurality of rotatable, elongated rollers mounted side by side with their longitudinal axes substantially parallel and disposed in a common plane, wherein means are provided for oscillating at least one of the said rollers to displace it from the common plane and to provide a continually varying surface against which a sample may be urged and means for urging the sample into contact with at least some of said rollers.

5. Apparatus as in claim 1, wherein the said rollers are cylindrical and all of the same diameter, the distance between the centers of adjacent rollers being less than twice the diameter of the said rollers.

6. Apparatus as in claim 1 in which at least some of the said rollers are other than cylindrical.

7. Apparatus as in claim 1 wherein means are provided for rotating a sample to be tested about its axis.

8. Apparatus as in claim 1 wherein means are provided for preventing the rotation of at least some of the said rollers.

9. Apparatus as in claim 1 wherein means are provided for causing the said rollers to rotate with a peripheral speed different from that of the sample under test.

10. Apparatus for testing a sample toroidal, deformable object, comprising a plurality of rotatable, elongated rollers mounted side by side with their longitudinal axes substantially parallel, and means for urging a sample into contact with at least some of said rollers, wherein means are provided for selectively heating and cooling at least some of the said rollers.

11. Apparatus as in claim 10, wherein at least some of the said rollers are hollow to allow heating or cooling fluids to be passed therethrough.

References Cited by the Examiner

UNITED STATES PATENTS

| | | | |
|---|---|---|---|
| 1,478,532 | 12/1923 | Schafer | 73—8 |
| 1,981,476 | 11/1934 | Statz | 33—203.13 |
| 2,695,520 | 11/1954 | Karsai | 73—146 |
| 2,812,583 | 11/1957 | Herzegh | 73—146 X |
| 2,979,942 | 4/1961 | Allen | 73—117 |
| 3,130,957 | 4/1964 | Branick | 73—146 X |

LOUIS R. PRINCE, *Primary Examiner.*

D. O. WOODIEL, *Assistant Examiner.*